June 7, 1927.
W. BURKART
1,631,118
STAKE FOR TRUCKS, WAGONS, AND OTHER VEHICLES
Filed June 29, 1925
2 Sheets-Sheet 1
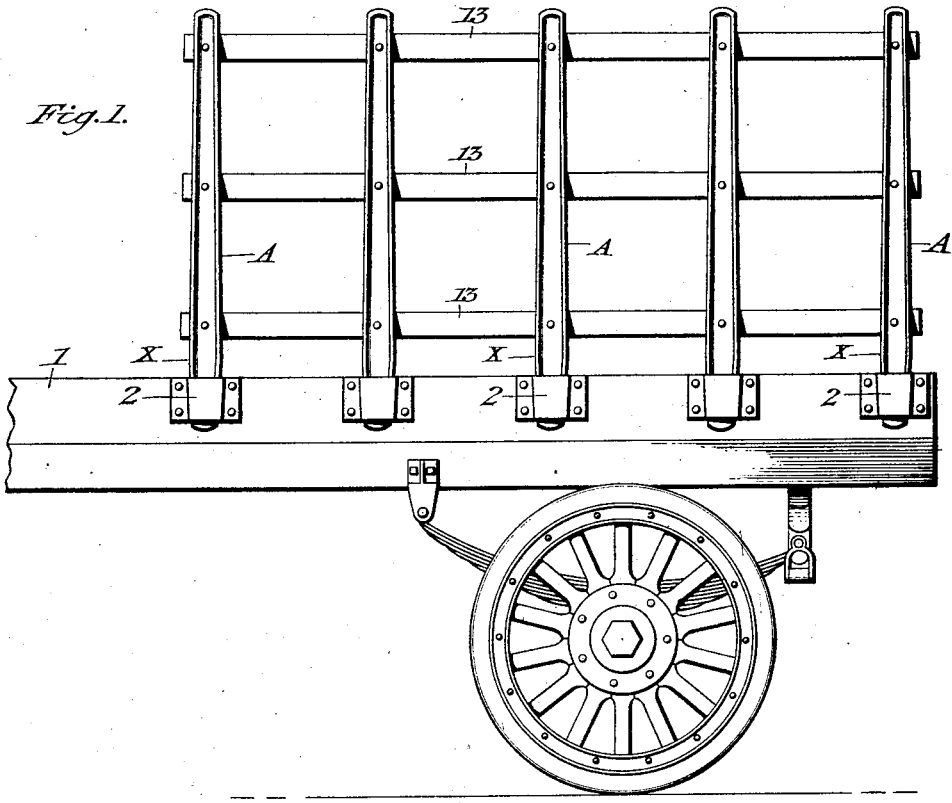
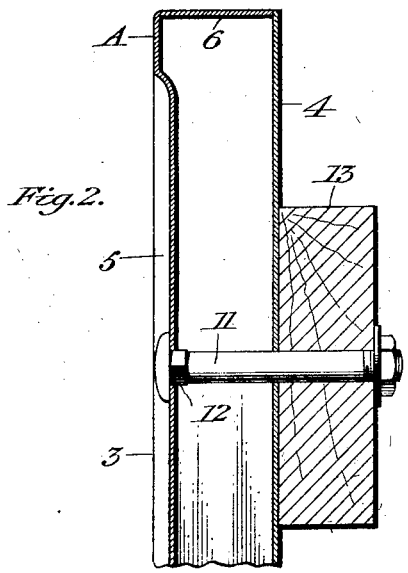
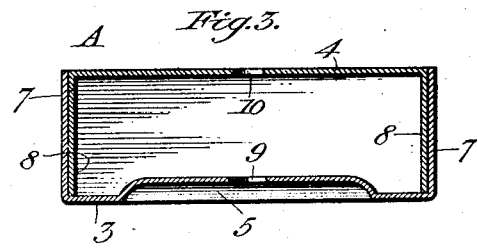
Inventor:
William Burkart.
By H. S. Bailey, Attorney.

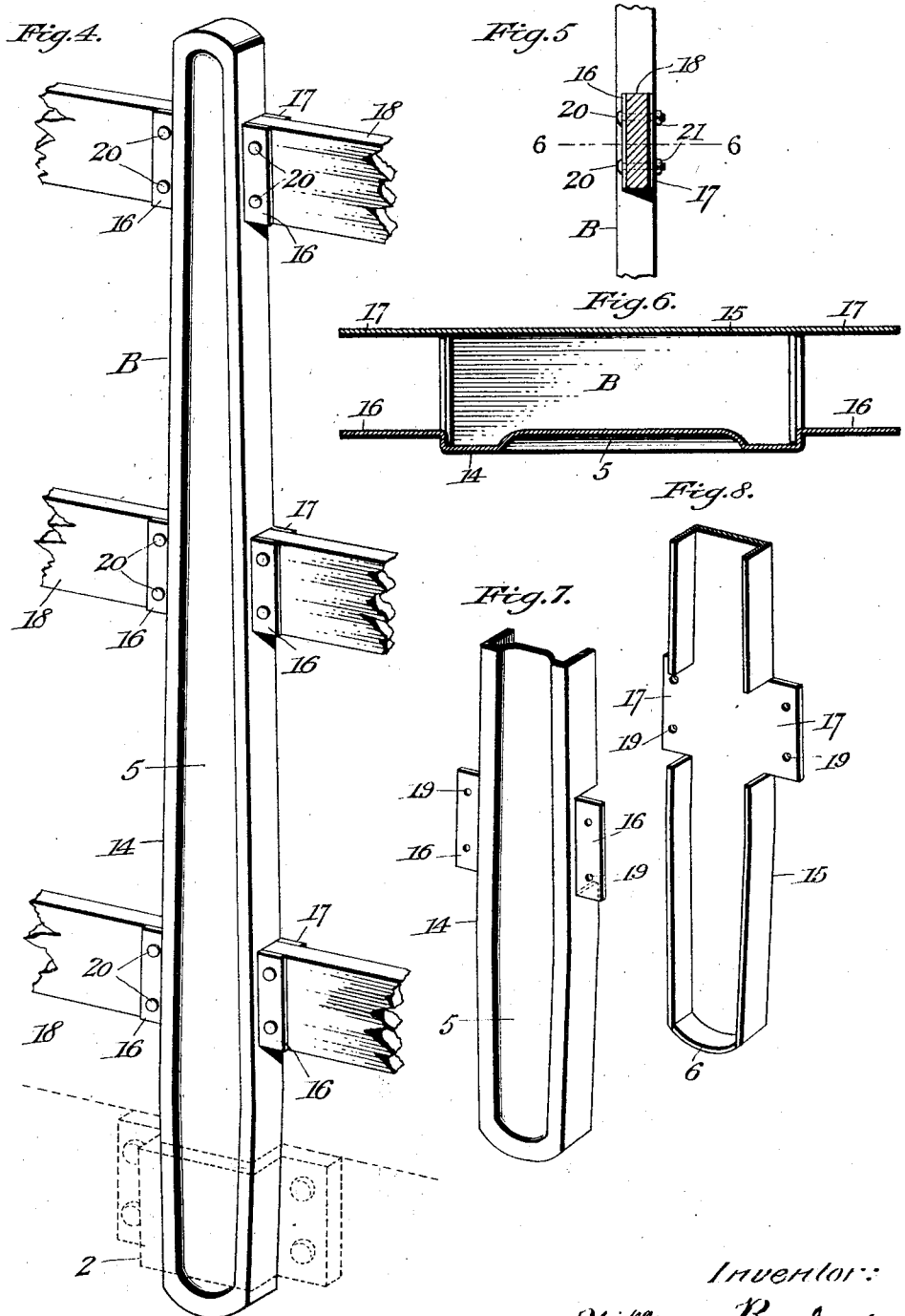

Patented June 7, 1927.

1,631,118

UNITED STATES PATENT OFFICE.

WILLIAM BURKART, OF DENVER, COLORADO.

STAKE FOR TRUCKS, WAGONS, AND OTHER VEHICLES.

Application filed June 29, 1925. Serial No. 40,404.

My invention relates to improvements in stakes for trucks, wagons and other vehicles.

The primary object of the invention is to provide a hollow metal stake which combines the maximum of strength with lightness and simplicity of construction.

Further, to provide a hollow sheet metal stake comprising two members of channel bar form, which are secured one within the other thereby providing a double thickness of metal along the sides of the stake, which afford the maximum of strength and rigidity in a stake of this character, to withstand pressure against either face thereof.

Further, to provide a hollow stake made of two sheet metal channel members which fit one within the other, opposing tongues being severed from the opposite sides of each member and bent out at right angles to form openings through said stake to receive horizontal rails, said tongues being bolted to the said rails.

These objects are accomplished by the device illustrated in the accompanying drawings in which, Fig. 1 is a side view of the rear portion of a truck equipped with hollow metal stakes the side bars or rails being bolted to the inner faces of the said stakes.

Fig. 2 is a sectional view—full size—of the upper end portion of the form of stake shown in Fig. 1, showing the manner of bolting the horizontal side bars thereto.

Fig. 3 is a horizontal sectional view through the stake shown in Figures 1 and 2.

Fig. 4 is a perspective view of a modified form of the hollow metal stake in which, the side bars pass through openings in the said stake.

Fig. 5 is an edge or side view of a portion of the said stake.

Fig. 6 is a horizontal sectional view—full size—taken on the line 6—6 of Fig. 5, but omitting the side rail, and Figures 7 and 8 are perspective views of the lower end portions of the two channel members which constitute a stake, and showing the manner of forming the openings for the reception of the side rails.

Heretofore, stakes for wagons, trucks and other vehicles, have been made either of wood, or wood encased in a metal jacket which covers the two sides or edges and one face of the same. The all-wood stakes lack the required strength and therefore must be frequently replaced on account of breakage and even the wood stakes having metal jackets have been found to lack the strength necessary for the usage to which they are often subjected.

The improved stake, however meets all requirements as to strength, lightness and cheapness of construction, as will be hereinafter set forth.

Referring to the accompanying drawings:

The numeral 1 indicates the body portion of a style of truck in common use and 2 the stake-receiving sockets or staples which are bolted to the sides thereof and the openings through the staples taper slightly toward their lower ends as shown. In Figures 1, 2 and 3, is shown the simplest form of the improved hollow metal stake, to the inner face of which the usual side rails are adapted to be bolted, and this form of stake is constructed as follows: This stake A is made up of two members 3 and 4 which are in the form of channel bars, which taper slightly toward both ends from points $x$ near their lower ends and one of the members is of a size to fit snugly in the other member. The members are pressed or stamped out of sheet metal of a thickness to give the necessary strength and the face of the outer member 3 is formed with a shallow depression 5 which is of slightly less length and width than the said face, and this depression not only gives an artistic appearance to the stake but it makes the member 3 more rigid than it would be if its face were perfectly flat. The channel members 3 and 4 are about an inch in depth, and the ends of the stake are closed by bending the end portions of one or both members at right angles, as shown at 6, Fig. 2.

When the members 3 and 4 are assembled to form a hollow stake, as shown in Fig. 3, the sides 7 of the member 3 adjoin the side 8 of the member 4, and the adjoining sides are welded together thus preventing separation of the members. By this construction, a double thickness of metal is provided throughout the length of each side of the stake, which gives great strength and rigidity to the stake, and thus enables it to withstand a much greater lateral strain in either direction, than is possible in stakes as at present constructed.

The stake sockets or staples 2 are tapered to correspond to the tapered lower end portions of the stakes, so that when the stakes are placed in the socket their lower ends will project slightly below the sockets, as shown in Fig. 1 but further downward movement of the stake will be prevented by the taper of the stake and the taper of the socket, as will be understood.

The stake is provided with alined bolt holes 9 and 10, the holes 9 being square, and bolts 11 are passed through these holes, said bolts having square portions 12 adjoining their heads which fit in the square holes 9 and thus prevent turning of the bolts. The bolts also pass through side rails 13, and nuts are secured upon their outer ends and clamp the rails to the inner faces of the stakes, as shown in Fig. 2. Three rails are shown in Fig. 1, but more or less rails may be used as desired.

In Figures 4 to 8 inclusive, I have shown a form of the stake having alined openings in the sides thereof through which the rails are passed, the constructions being as follows:

These stakes B are made up of two channel members 14 and 15, the same as the stake A and the face of the member 14 is also formed with a longitudinal depression 5, the same as the member 3. Pairs of tongues 16 are severed by parallel slits from the sides of the channel member 14, and these tongues are bent back to stand at right angles to the said sides as clearly shown and are bent on lines a slight distance in from the front of the member 14 so that they will lie in line with the depressed part of the said member, as clearly shown in Figure 6. Pairs of tongues 17 are also severed from the sides of the channel member 15 and these tongues are also bent back to stand at right angles to the said sides but the slits which sever the tongues from the sides extend into the face of the channel, so that when the tongues are bent back they are level with the face of channel, as clearly shown in Figures 6 and 8.

Each pairs of ears 16 of the member 14, is directly opposite a pair of ears on the member 15 and the openings formed in the stake by bending back the ears 16 and 17 will correspond in dimensions, to the width and thickness of the rails 18 which are passed through the said openings. The ears 16 and 17 are provided with bolt holes 19 and bolts 20 are passed through the said holes and through holes in the rails 18 and secured by nuts 21 as shown in Fig. 5. This construction provides a very practical way of securing the rails to the stakes, as the rails are supported entirely by the stakes, the bolts merely holding the rails against endwise movement in either direction; and if several of the bolts should work loose and drop out of place the rails would still serve their purpose just as effectively as before, as all pressure against them is borne by the stakes and not by the bolts.

The improved stake is not only extremely light but is strong and durable and can be cheaply made.

Having described my invention what I claim as new and desire to secure by Letters Patent is:

1. A hollow metal stake of the character described comprising two channel-like sheet metal members, which are secured one within the other with the open sides of the channels facing each other, thereby forming a stake having a double thickness of metal along opposite sides thereof, the overlapping side members of each side being slitted at intervals to release tongues which are bent out at right angles to said side members, thereby forming rail-receiving openings through the stake, said tongues being provided with bolt holes, the end portions of the members being bent over at right angles to close the ends of said stake.

2. A hollow metal stake of the character described comprising two channel-like sheet metal members which are secured one within the other with the open sides of the channels facing each other, thereby forming a stake having a double thickness of metal along two opposite sides thereof, the overlapping side members of said sides being slitted at points equally spaced from the ends of the stake, the tongues thus provided being bent outwardly from said sides to provide longitudinally aligned openings in said sides of the stake for the reception of a rail, said tongues being perforated to receive attaching means for a rail, and end portions of said channels being bent over at right angles to close the ends of the stake.

In testimony whereof I affix my signature.

WILLIAM BURKART.